May 15, 1928. 1,669,553
J. DERRY
FRICTION DRIVING MECHANISM
Filed Feb. 1, 1926
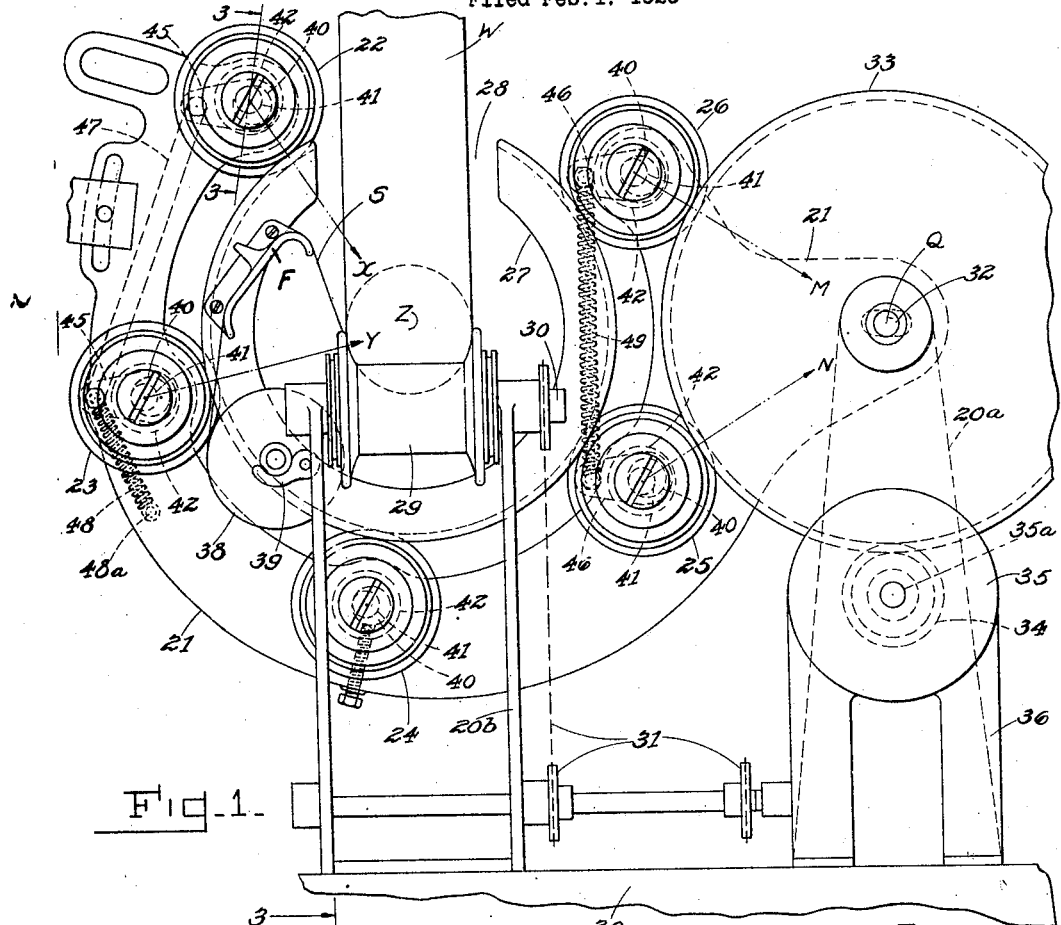
Fig. 1.
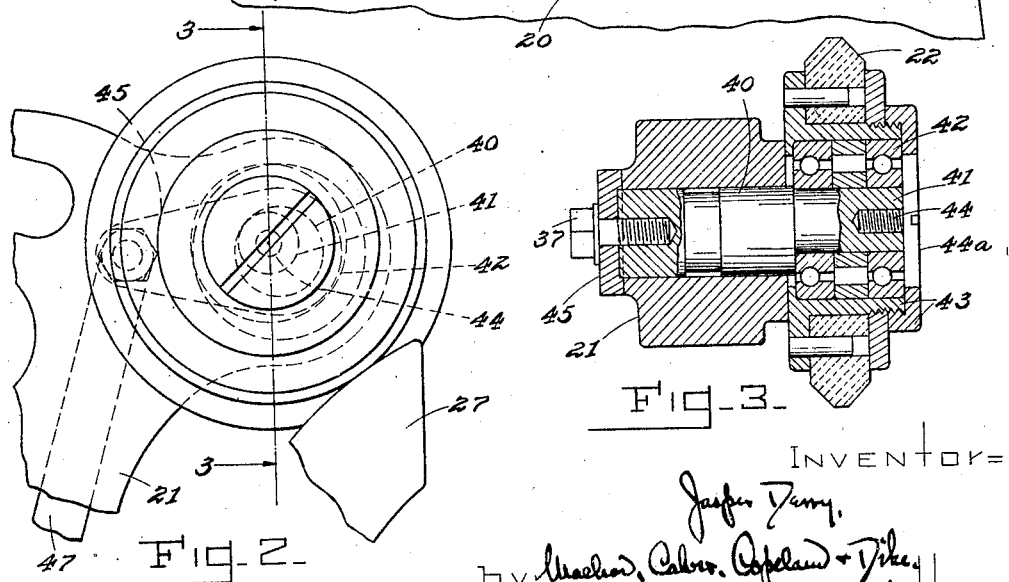
Fig. 2.
Fig. 3.
INVENTOR=
Jasper Derry,
by MacLeod, Calver, Copeland & Dike,
Attys.

Patented May 15, 1928.

1,669,553

UNITED STATES PATENT OFFICE.

JASPER DERRY, OF MEDFORD, MASSACHUSETTS, ASSIGNOR TO ANDREW TERKELSEN, OF BOSTON, MASSACHUSETTS.

FRICTION DRIVING MECHANISM.

Application filed February 1, 1926. Serial No. 85,184.

This invention relates to tension mechanism for friction driving and driven members or rollers and the invention is particularly, although not exclusively, adapted for use in connection with friction driving and supporting mechanism for annular shuttles in wrapping machines, such for example as tire wrapping machines as herein illustrated.

Heretofore where, for instance, the annular shuttle of the wrapping machine has been rotated by a V-type friction drive, it was found that the engagement of the shuttle and supporting and driving friction rollers resulted in the development of considerable heat, expanding the cooperating surfaces of metal or other material to such an extent as to result in binding and a rapid wearing away of the surfaces.

An object of the present invention is to eliminate the foregoing disadvantages and to provide a more efficient friction drive between driving and driven members in which these members are constructed to yield with relation to one another as a result of which compensation for wear is provided, and undue friction between the metal surfaces causing them to heat up and bind is obviated.

Other objects of the invention will appear in the following description and appended claims, reference being had to the accompanying drawings forming a part of this specification wherein like reference characters designate corresponding parts in the several views, and wherein:

Fig. 1 is a side elevation of a tire wrapping machine embodying my invention.

Fig. 2 is a detail fragmentary view showing the manner of supporting one of the rollers.

Fig. 3 is a sectional view taken substantially on lines 3—3 of Fig. 1 looking in the direction of the arrows.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

While the invention may be otherwise employed it is shown by way of example in Fig. 1 as applied to a machine for wrapping automobile tires with helical windings of a strip of paper. As shown, the frame of the machine comprises a suitable base 20 rising from which is an upright $20^a$ to which is pivoted a yoke 21 having an open top, and carrying a circular series of rollers 22, 23, 24, 25 and 26 for rotatably supporting an annular shuttle 27 formed with an opening 28 adapted to register with the open top of the yoke in order to permit insertion of the tire or other work W. Said tire W is supported with its lowermost portion centered with respect to the shuttle 27 by means of a pair of work supporting and rotating rollers one of which is shown at 29, each roller being carried by a shaft 30, journalled in suitable bearings in an upright $20^b$ and having driving connections partly indicated at 31 whereby the tire is rotated from the shaft $35^a$ of an electric motor 35. The shuttle 27 and work supporting rollers 29 are, connected for simultaneous rotation in synchronism, the arrangement being such that the work W is turned relatively slowly with respect to the shuttle 27. The rollers 25 and 26 not only support the shuttle but also drive the same, being engaged and rotated by a fricton disk 33 rotatably supported on a shaft 32 and in turn engaged and rotated by a friction pinion 34 on the shaft $35^a$ of the electric motor, the latter being carried by a frame 36 adapted to be raised and lowered, to engage the pinion 34 with the disk 33 and disengage the same therefrom, by means of a suitable tread operated lever (not shown). The yoke 21 may be adjusted about the fixed axis of the shaft 32 to center the shuttle 27 with respect to tires of different sizes, as is usual in machines of the type illustrated.

The wrapping material, herein illustrated as a strip S, is supplied from a roll 38 rotatably supported on the shuttle 27, and the rotation of this roll may be resisted so as to apply the proper tension to the strip by means of a suitable friction brake mechanism 39. From the roll 38 the strip S of wrapping material passes through a suitable folding device F and thence to the tire or work W.

Each of the rollers 22-26 inclusive is in the present instance, adjustably supported in substantially the same manner, the construction thereof being shown in Fig. 3, and hence a detail description of the eccentric mounting for one roller suffices for all. Rotatably mounted in the supporting yoke 21 is a short shaft 40 terminating at one end in a crank or eccentric portion 41 carrying an antifriction bearing 42 for the roller 22 (or a roller 23, 24, 25 or 26). This roller is free to rotate relatively to the eccentric 41 and is held in position against the yoke by means of a screw 44 having a head 44ᵃ which engages the bearing 42, the latter being received between collars 43 forming parts of the roller. At the opposite end of the shaft 40 is secured an operating arm 45 or 46 which may be secured to the shaft by means of a bolt 37, or in any other suitable manner. From the foregoing construction it will be seen that by swinging the arm 45 or 46, the shaft 40 will be rocked, thereby turning the eccentric 41 and shifting the position of the roller 22 with respect to the axis of shaft 40.

Referring to Figs. 1 and 2, it will be seen that, in the present instance, the rollers 22, 23 and 24 are idlers or shuttle supporting and centering rollers. The roller 24 is designed for manual adjustment in order to locate the same when the machine is set up, no subsequent adjustments, except to compensate for wear, being thereafter usually necessary. The eccentric 41 for this roller is held in adjusted position as by means of a set screw. The upper ends of the operating arms 45 on the shafts 40 of the rollers 22 and 23 are, however, connected together by means of a rigid link 47, and a tension spring 48 is secured at one end to a suitable stud 48ᵃ carried by the yoke 21 and at its opposite end is connected to the pivot connecting the link 47 and operating arm 45. From this construction it will be seen that the eccentrics which support the rollers 22 and 23 are connected by means of the rigid link 47 and are both yieldingly controlled through the medium of the spring 48.

The rollers 25 and 26 in the present instance constitute driving as well as centering and supporting rollers, and the operating arms 46 for the shafts 40 upon which these rollers are mounted are connected together by means of a spiral tension spring 49.

In the operation of the mechanism, the tendency of the spring 48 is to swing both arms 45 downwardly, and the position of the eccentrics 41 for the rollers 22 and 23 is such that this downward movement of arms 45 will result in forcing the rollers 22 and 23 yieldingly against the shuttle 27, thereby tending to bodily move the shuttle to the right in Fig. 1. The direction of these forces is shown by lines $x$ and $y$ in Fig. 1, which converge toward the center Z of the shuttle. The position of the eccentrics 41 for the rollers 25 and 26 is such that these rollers will be forced yieldingly in the direction of the driving disk 33 through the action of the spring 49. The direction of these forces is shown by lines $m$ and $n$ which converge toward the center Q of disk 33.

Thus it will be seen that the normal action of the spring 48 is to urge the rollers 22 and 23 in the same direction as the direction in which the spring 49 urges the rollers 25 and 26. The shuttle, under the yielding pressure of the rollers 22 and 23, is forced or urged laterally against rollers 25 and 26 which in turn yield on their eccentrics in the same direction and press against the friction disk or member 33. During operation any expansion or wearing away of the metal surfaces of the shuttle and rollers, due to heat developed by friction, is compensated for by the yielding movement of the rollers against the action of springs 48 and 49 so that at all times the proper pressure is exerted by the rollers against the shuttle necessary for satisfactory and efficient operation at all times.

It will be seen that the arm 45 connected to the eccentric which supports roller 22 is rigidly connected by link 47 to the arm 45 connected to the eccentric for the roller 23. This construction prevents the upper roller 22 from moving inwardly when the opening 28 of the shuttle is opposite this roller. The yielding movement of the roller 22 is therefore controlled in accordance with the yielding movement of the lower roller 23, so that when the opening 28 is opposite the roller 22 the latter cannot move inwardly to cause the end of the shuttle gap to strike the roller, since at such time the lower roller 23 will be in engagement with the shuttle thereby holding the upper roller 22 in proper position with respect to the periphery of the shuttle. No such provision is required in the case of the rollers 25 and 26 which are yieldingly held against the continuous or unbroken periphery of the disk 33.

It is to be understood that by describing in detail herein any particular form, structure, or arrangement, it is not intended to limit the invention beyond the terms of the several claims or the requirements of the prior art.

What I claim is:

1. The combination of a rotary annular shuttle having an opening in its periphery, a pair of rollers engaging the periphery of said shuttle, and means for resiliently urging said rollers toward said shuttle, and means for rigidly connecting said rollers for movement in unison.

2. The combination of a rotary annular shuttle having an opening in its periphery, a pair of rollers engaging the periphery of said shuttle, eccentrics on which said rollers are mounted, a link connecting said eccentrics for movement in unison, and a spring acting on said eccentrics in the direction to urge said rollers toward said shuttle.

3. The combination of an annular shuttle, two oppositely located sets of rollers engaging the periphery of the shuttle, a driving member for frictionally driving one set of rollers, and spring controlled means for urging each set of rollers toward said driving member.

4. The combination of an annular shuttle, two oppositely located sets of rollers engaging the periphery of the shuttle, a driving member for frictionally driving one set of rollers, and spring controlled means for urging each set of rollers toward said driving member, said means comprising a movable eccentric for supporting each roller and a spring connected to the eccentric of each set of rollers.

5. The combination of a rotatable annular shuttle having an opening at the periphery to permit insertion of an article to be wrapped, two oppositely located pairs of rollers engaging the periphery of the shuttle, a movable eccentric for rotatably supporting each roller, a swinging arm connected to each eccentric, a rigid spring controlled link connecting one pair of eccentrics, and a spring connecting the other pair of eccentrics.

6. The combination of a rotary shuttle, said shuttle having a peripheral substantially V-shaped groove, two oppositely located sets of rollers having peripheries formed to enter and substantially fit said groove, a driving member for frictionally driving one set of rollers, and spring controlled mechanism for yieldingly urging each set of rollers toward said driving member.

In testimony whereof I affix my signature.

JASPER DERRY.